United States Patent
Suzuki et al.

(10) Patent No.: US 10,279,709 B2
(45) Date of Patent: May 7, 2019

(54) RECLINER

(71) Applicant: TOYOTA BOSHOKU KABUSHIKI KAISHA, Aichi-ken (JP)

(72) Inventors: Hiroyuki Suzuki, Aichi-ken (JP); Hiroaki Teraguchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/602,637

(22) Filed: May 23, 2017

(65) Prior Publication Data

US 2017/0334321 A1 Nov. 23, 2017

(30) Foreign Application Priority Data

May 23, 2016 (JP) ................................. 2016-102431

(51) Int. Cl.
*B60N 2/235* (2006.01)
*B60N 2/225* (2006.01)

(52) U.S. Cl.
CPC ......... *B60N 2/2356* (2013.01); *B60N 2/2362* (2015.04); *B60N 2/2252* (2013.01)

(58) Field of Classification Search
CPC .. B60N 2/2362; B60N 2/2356; B60N 2/2252; B60N 2/20; B60N 2/235; B60N 2/2358
USPC ...................... 297/362, 367 P, 366
See application file for complete search history.

(56) References Cited

U.S. PATENT DOCUMENTS

| 8,708,412 B2 * | 4/2014 | Berndtson .............. B60N 2/236 297/367 L |
| 8,882,199 B2 * | 11/2014 | Yamada .................... 297/367 P |
| 9,315,121 B2 * | 4/2016 | Enokijima ........... B60N 2/2213 |
| 2011/0025114 A1 * | 2/2011 | Berndtson .............. B60N 2/236 297/367 P |

(Continued)

FOREIGN PATENT DOCUMENTS

| CN | 202243072 | 5/2012 |
| CN | 102951043 | 3/2013 |

(Continued)

OTHER PUBLICATIONS

Office Action issued in China Counterpart Patent Appl. No. 201710367090.1, dated Nov. 29, 2018, along with an English translation thereof.

*Primary Examiner* — Chi Q Nguyen
(74) *Attorney, Agent, or Firm* — Greenblum & Bernstein, P.L.C.

(57) ABSTRACT

A recliner including a ratchet and a guide mounted in an axial direction, and a lock mechanism configured to lock relative rotation between the ratchet and the guide by meshing in a radial direction, the lock mechanism including a plurality of poles which is configured to be supported in a circumferential direction by the guide and has outer circumferential teeth configured to mesh with inner circumferential teeth formed on the ratchet as the poles are pushed outwards in the radial direction to be moved, the plurality of poles including a specific pole, wherein the specific pole includes a pressing portion configured to contact a restraint portion of the guide from an inner side in the radial direction so as to be restrained from moving in the circumferential direction as the specific pole is pushed outwards in the radial direction by an operating cam to be moved.

7 Claims, 11 Drawing Sheets

(56) References Cited

U.S. PATENT DOCUMENTS

| | | | |
|---|---|---|---|
| 2011/0254338 A1* | 10/2011 | Fisher, III | B60N 2/236 297/367 P |
| 2012/0119555 A1* | 5/2012 | Aktas | B60N 2/2218 297/366 |
| 2012/0261964 A1* | 10/2012 | Yamaguchi | B60N 2/12 297/378.14 |
| 2012/0292970 A1* | 11/2012 | Yamada | 297/354.1 |
| 2013/0026808 A1 | 1/2013 | Uramichi et al. | |
| 2014/0159458 A1 | 6/2014 | Lu et al. | |
| 2015/0035338 A1 | 2/2015 | Endou | |
| 2015/0035339 A1* | 2/2015 | Endou | B60N 2/236 297/367 R |
| 2015/0135338 A1* | 5/2015 | Moskal | H04L 63/0823 726/30 |
| 2015/0306987 A1* | 10/2015 | Kitou | B60N 2/2352 297/367 P |
| 2015/0360589 A1* | 12/2015 | Robinson | B60N 2/236 297/367 P |
| 2016/0059743 A1* | 3/2016 | Tsuji | B60N 2/2252 297/362 |

FOREIGN PATENT DOCUMENTS

| | | |
|---|---|---|
| CN | 104340092 | 2/2015 |
| JP | 2013-22409 | 2/2013 |

* cited by examiner

RECLINER

CROSS-REFERENCE TO RELATED APPLICATIONS

This application claims priority from Japanese Patent Application No. 2016-102431 filed on May 23, 2016, the entire contents of which are incorporated herein by reference.

TECHNICAL FIELD

The disclosure relates to a recliner. Specifically, the disclosure relates to a recliner configured to function as a rotary shaft device capable of stopping rotation.

BACKGROUND

In related art, a configuration of a vehicle seat where a seat back is coupled to a seat cushion via a recliner so that a backrest angle can be adjusted has been known (JP-A-2013-22409). The recliner has a ratchet and a guide mounted to be rotatable relative to each other and a lock mechanism capable of locking the relative rotation between the ratchet and the guide. The lock mechanism has a configuration where a plurality of poles set to the guide is meshed with inner circumferential teeth formed on an outer circumferential part of the ratchet and the relative rotation between the ratchet and the guide is thus locked.

Specifically, the plurality of poles is supported in a circumferential direction by the guide and is pushed outwards in a radial direction to be moved, so that outer circumferential teeth thereof are meshed with the inner circumferential teeth of the ratchet. Also, one of the plurality of poles is configured as a division pole bisected obliquely in the circumferential direction and is pushed outwards in the radial direction to be moved, so that the pole is pushed in a form of increasing a width in the circumferential direction and is meshed with the inner circumferential teeth of the ratchet without the backlash relative to the guide in the circumferential direction. In this way, the ratchet and the guide are kept via the division pole without the backlash in the circumferential direction and the rotation is stopped.

In the above technology of the related art, the pole is divided, so that the number of components increases. In addition, since it is necessary to mount the divided small pieces to a narrow space, the manufacturing cost increases.

SUMMARY

It is therefore an object of the disclosure to provide a simple configuration capable of reducing a backlash in the circumferential direction when locking a recliner.

A recliner of the disclosure has the following configurations.

According to an aspect of the disclosure, there is provided a recliner configured to function as a rotary shaft device capable of stopping rotation, the recliner including: a ratchet and a guide mounted in an axial direction to be rotatable relative to each other; and a lock mechanism provided between the ratchet and the guide and configured to lock the relative rotation between the ratchet and the guide by meshing in a radial direction, the lock mechanism including: a plurality of poles which is configured to be supported in a circumferential direction by the guide and has outer circumferential teeth configured to mesh with inner circumferential teeth formed on the ratchet as the poles are pushed outwards in the radial direction to be moved, the plurality of poles including a specific pole; and an operating cam configured to push the plurality of poles outwards in the radial direction with respect to the guide, wherein the specific pole includes a pressing portion configured to contact a restraint portion of the guide from an inner side in the radial direction so as to be restrained from moving in the circumferential direction as the specific pole is pushed outwards in the radial direction by the operating cam to be moved.

Accordingly, even when a gap in the circumferential direction for securing slidability between the plurality of poles and the guide configured to support the plurality of poles in the circumferential direction is formed, the pressing portion of the specific pole comes into contact with the restraint portion of the guide when each pole is meshed with the ratchet. Accordingly, the backlash of the specific pole relative to the guide in the circumferential direction is restrained. By the restraint, it is possible to reduce the backlash between the ratchet and the guide in the circumferential direction with a simple configuration, via the specific pole that is meshed with the ratchet in conformity to the restraint.

DETAILED DESCRIPTION

Hereinafter, illustrative embodiments of the disclosure will be described with reference to the drawings.

First Illustrative Embodiment

<Schematic Configuration of Recliner 4>

Figure 1:
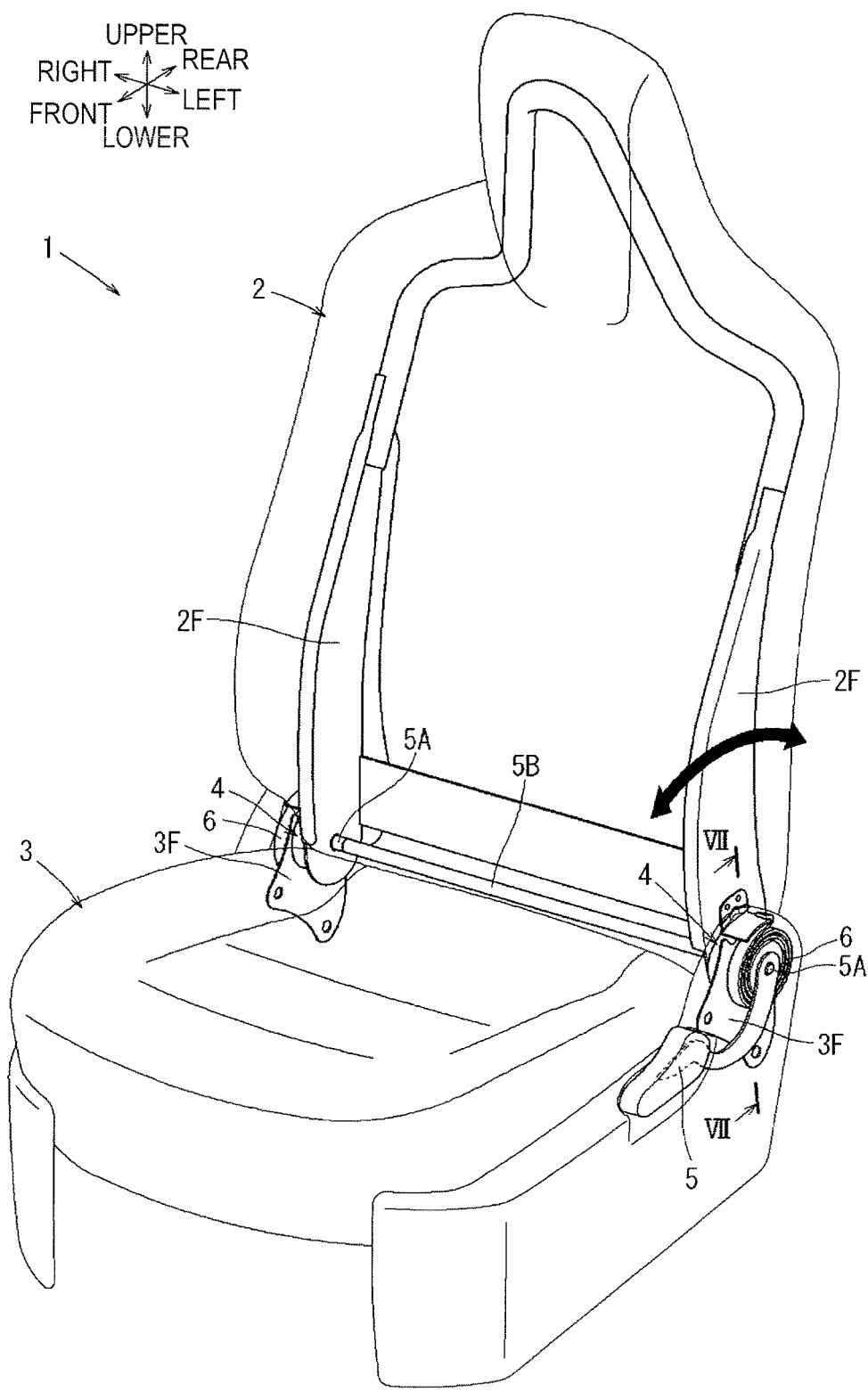
FIG. 1 is a perspective view depicting a schematic configuration of a vehicle seat to which a recliner of a first illustrative embodiment is applied.

First, a configuration of a recliner 4 in accordance with a first illustrative embodiment is described with reference to FIGS. 1 to 11. As shown in FIG. 1, the recliner 4 of the first illustrative embodiment is applied to a seat 1 configuring a left seat of an automobile, and is configured to function as a rotary shaft device (joint device) capable of stopping rotation and configured to couple a seat back 2 (a backrest of a sitting passenger) to a seat cushion 3 (a sitting part) so that a backrest angle can be adjusted. The recliner 4 is respectively provided between a lower end portion of each side frame 2F, which configures an internal frame of each of right and left sides of the seat back 2, and each reclining plate 3F, which configures an internal frame of a rear end portion of each of right and left sides of the seat cushion 3. The recliner 4 is configured to couple the side frame 2F and the reclining plate 3F so that they can rotate relative to each other (refer to FIGS. 2 and 3). The respective side frames 2F of the seat back 2 are arranged at inner sides relative to the respective reclining plates 3F in a width direction of the seat, and the respective recliners 4 are respectively interposed therebetween.

As shown in FIG. 1, each recliner 4 is normally held at a lock state where a backrest angle of the seat back 2 is fixed. Each recliner 4 is configured to switch to an unlock state where the backrest angle of the seat back 2 can be changed, by pulling up a reclining lever 5 provided at a side (left side) of the seat cushion 3 in an outer direction of the vehicle to release the lock state thereof all together. Also, each recliner 4 returns to the lock state by an urging force when the reclining lever 5 is returned from the pulled-up state.

A return spring 6 configured to always apply an urging force to the seatback 2 in a forward-fall rotation direction is hooked between each side frame 2F provided at the right and left sides of the seat back 2 and each reclining plate 3F arranged at the outer side relative to the side frame. By the rotation urging forces of the return springs 6, the fixed state of the backrest angle by the respective recliners 4 is released, so that the seat back 2 is raised to a position at which it comes into contact with a back of the sitting passenger and the backrest angle is freely adjusted in a front and rear direction ill conformity to a tilting movement of a body of the sitting passenger in the front and rear direction. Since the urging structure is provided, it is possible to conveniently adjust the backrest angle of the seat back 2.

The seat back 2 is configured to rotate relative to the seat cushion 3 within a rotation area of 90° or greater between a forward tilting posture position more inclined forward than an upright posture and a backward tilting position straightly tilted backward. Regarding the rotation area, a rotation area of about 90° between a position at which the backrest angle of the seat back 2 stands up straightly upwards and the backward tilting position is set as a rotation area of "lock zone" ill which when the pulling-up operation of the reclining lever 5 is stopped, the seat back returns to the state where the backrest angle of the seat back 2 is fixed. Also, a rotation area between the upright position of the backrest angle of the seat back 2 and the forward tilting posture position is set as a rotation area of "free zone" in which even when the pulling-up operation of the reclining lever 5 is stopped, the seat back is held at a release state without returning to the state where the backrest angle of the seat back 2 is fixed.

The respective rotation areas of the lock zone and the free zone are respectively formed by rotation areas of a lock zone and a free zone set for each recliner 4, which will be described later. The rotation area of the free zone is set, so that when the reclining lever 5 is operated at a state where a person does not sit on the seat 1, if the seat back 2 is tilted to a position in the free zone by the urging force, the seat back is automatically tilted to the forward tilting posture position even when the reclining lever 5 is not continuously operated.

<Detailed Configuration of Recliner 4>

Figure 2:
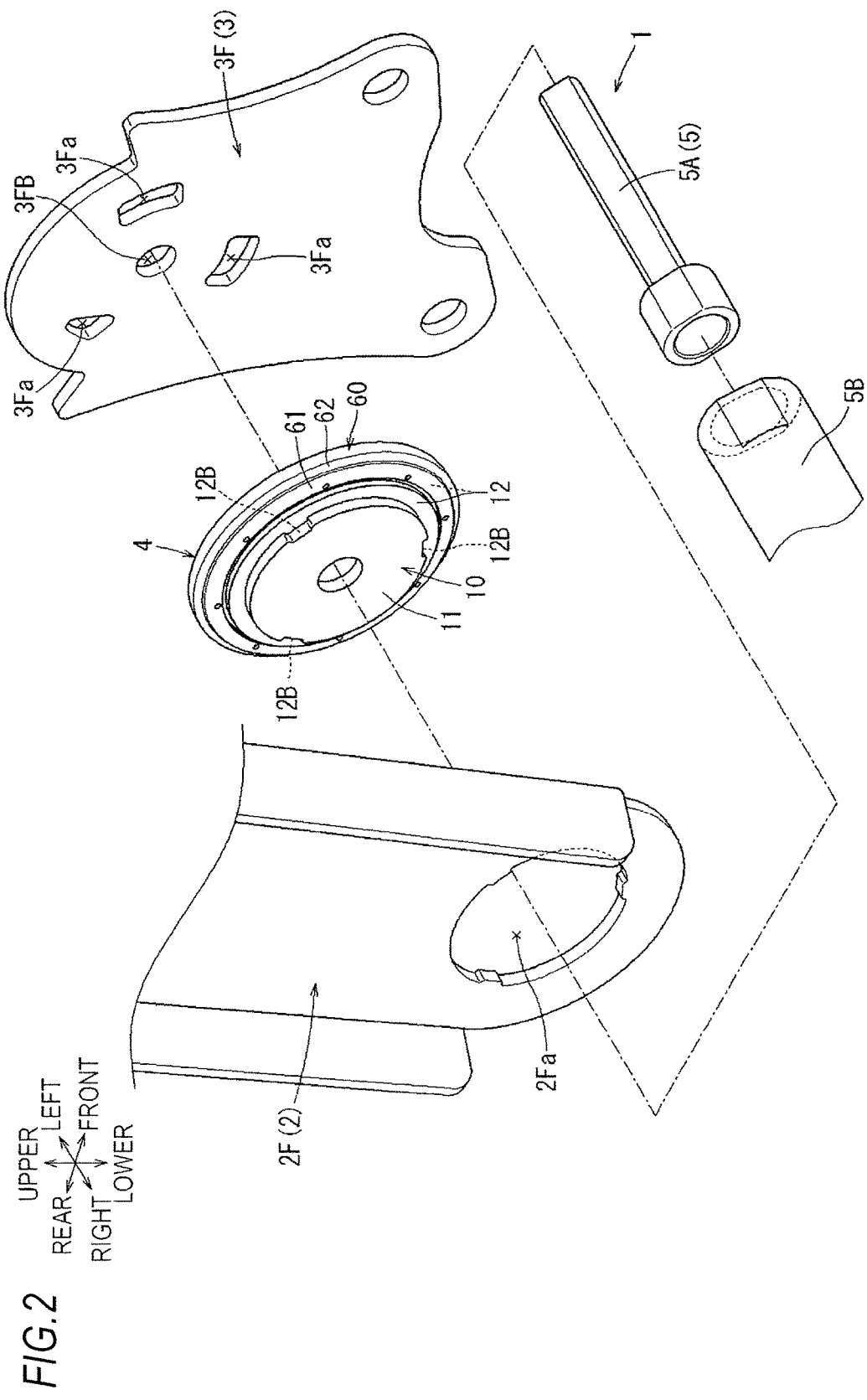
FIG. 2 is an exploded perspective view of a mounting part of the recliner, as seen from one side.
Figure 3:
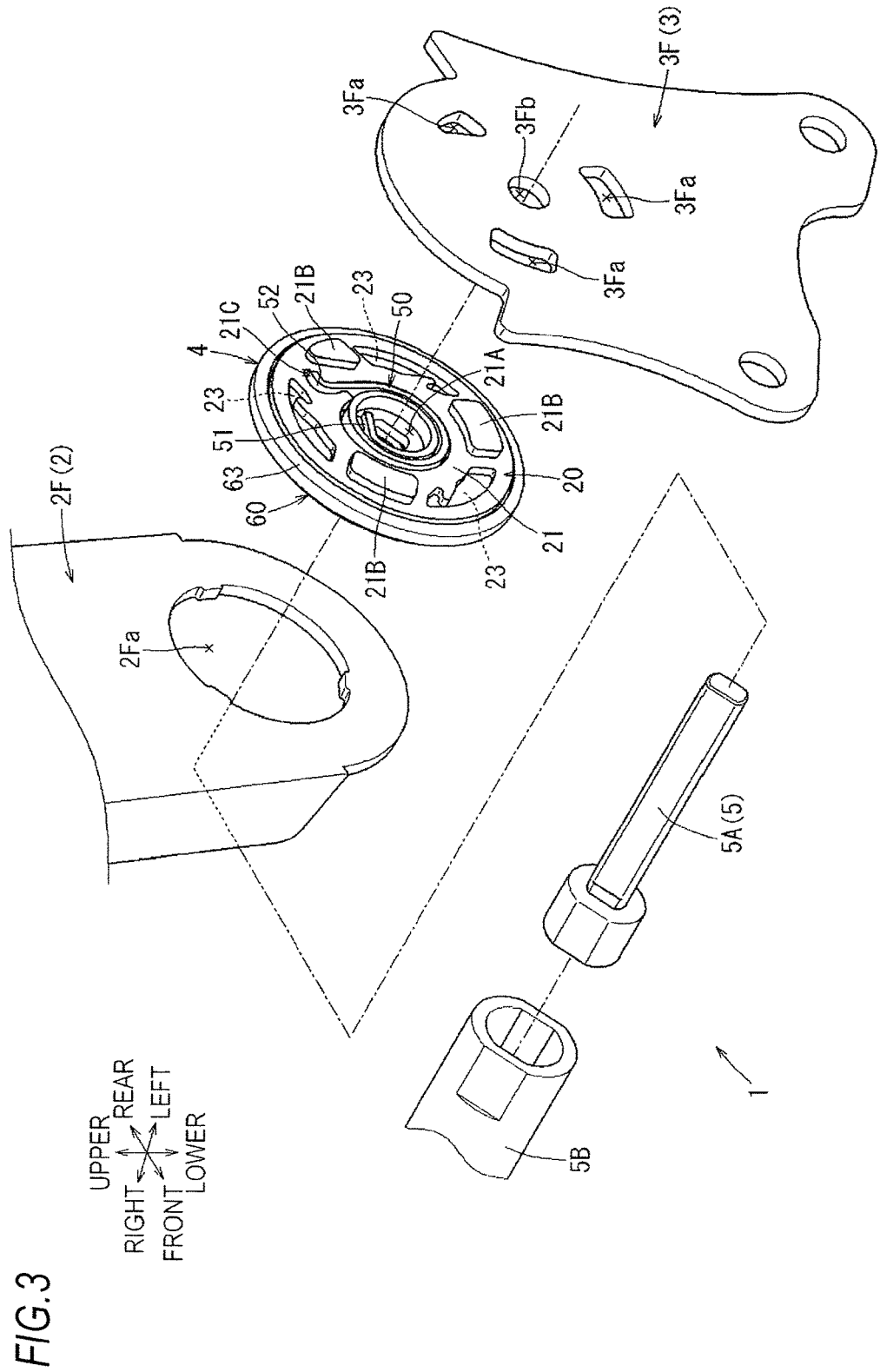
FIG. 3 is an exploded perspective view of the mounting part of the recliner, as seen from the other side.

As shown in FIGS. 2 and 3, specifically, each recliner 4 has a ratchet 10, which is integrally coupled to an outer surface of the side frame 2F provided at each side of the seat back 2, and a guide 20, which is integrally coupled to an inner surface of each reclining plate 3F, and relative rotation between the ratchet 10 and the guide 20 is locked or released, so that the backrest angle of the seat back 2 is fixed or released.

Figure 4:
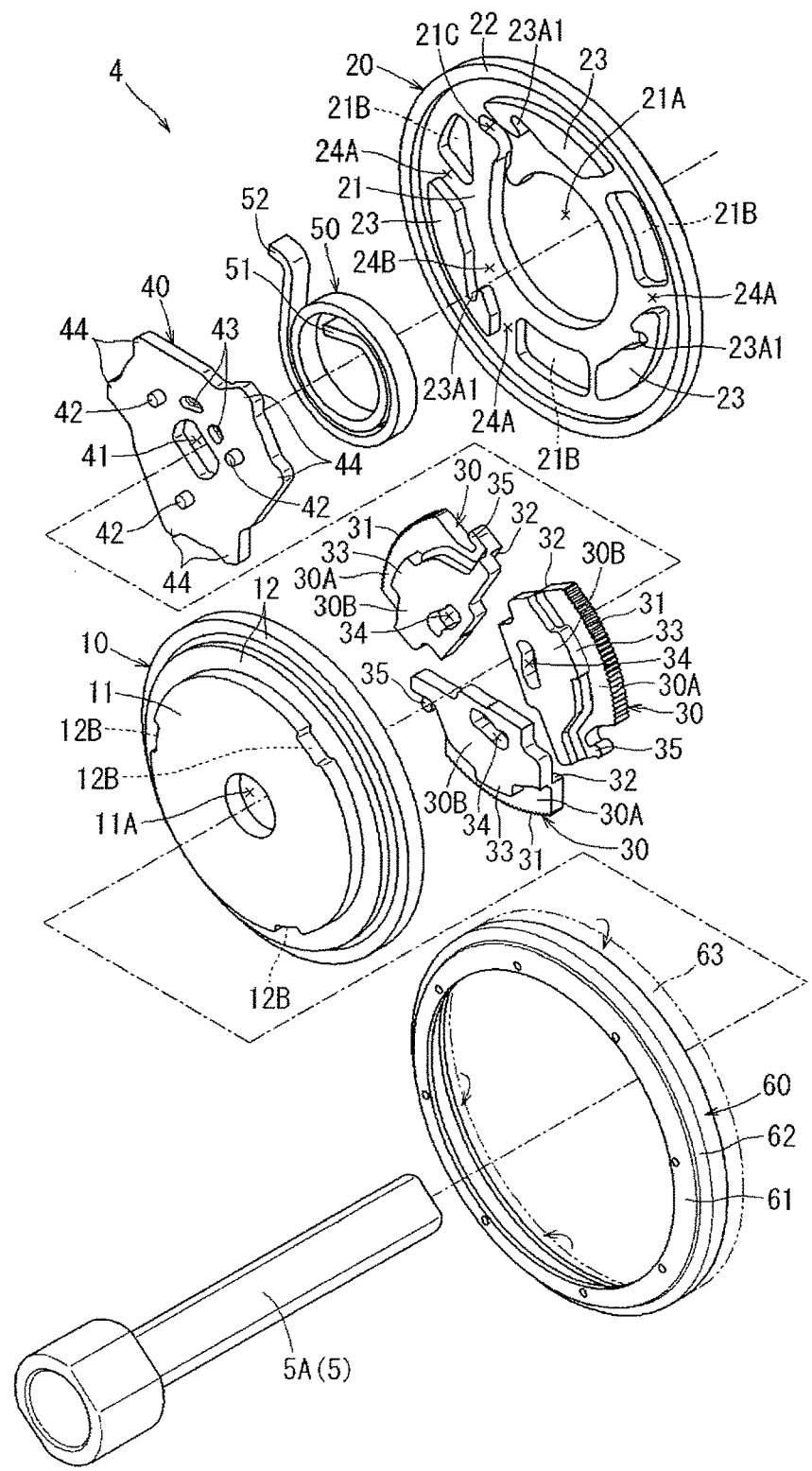
FIG. 4 is an exploded perspective view of the recliner, as seen from one side.
Figure 5:
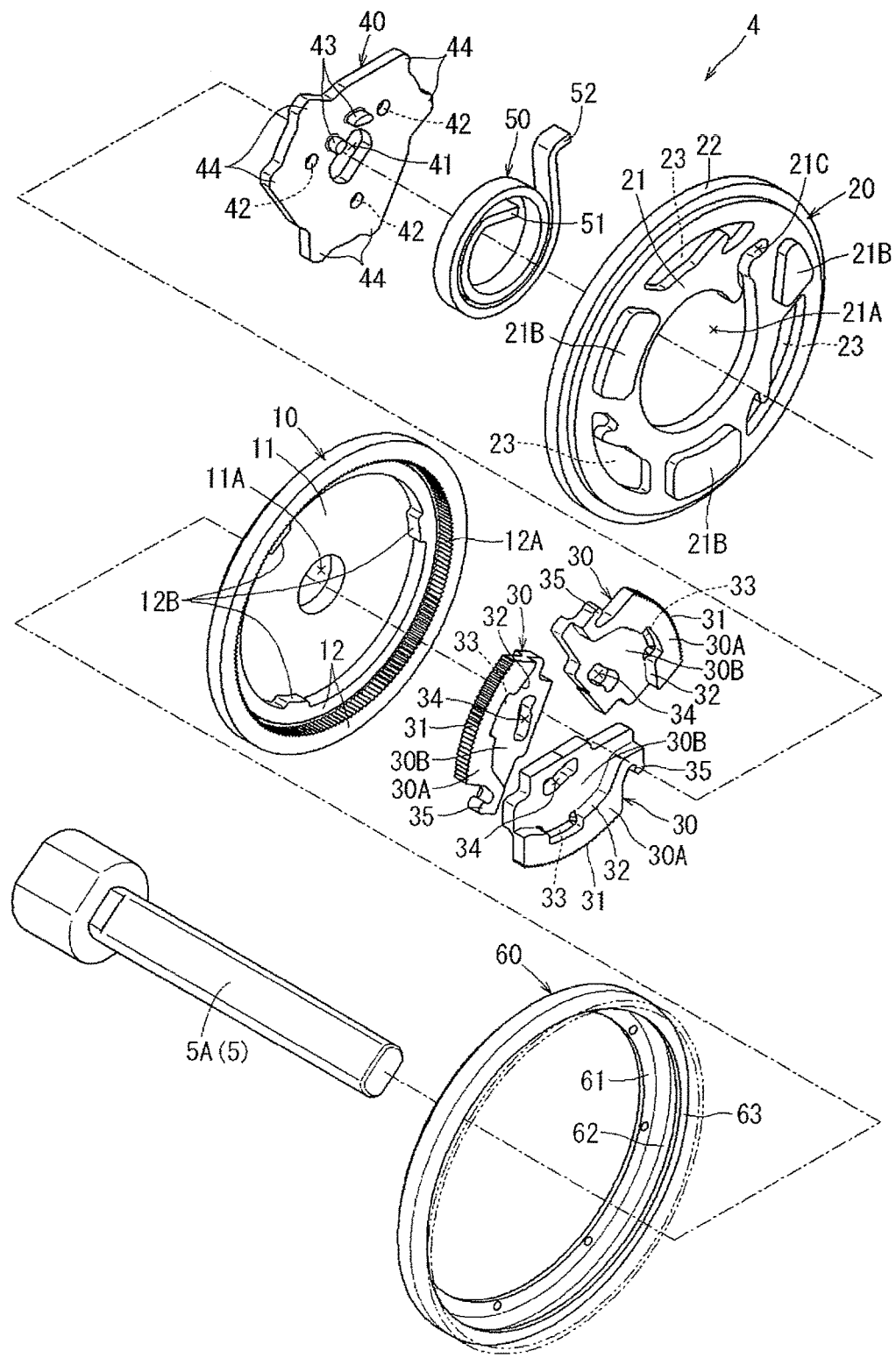
FIG. 5 is an exploded perspective view of the recliner, as seen from the other side.
Figure 6:
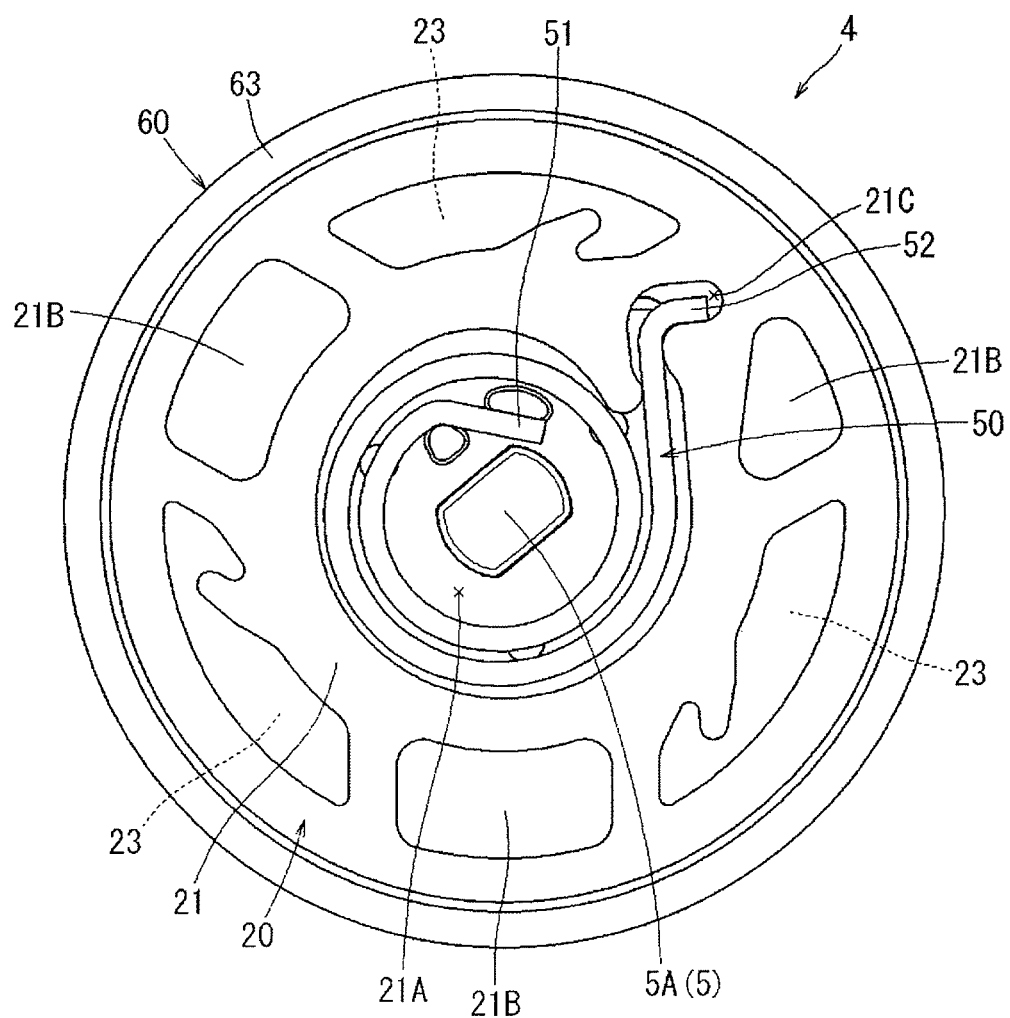
FIG. 6 is a front view of the recliner, as seen from a guide.

Hereinafter, the specific configuration of each recliner 4 will be described in detail. In the meantime, the respective recliners 4 are arranged in a bilaterally symmetric direction and have substantially the same configuration. Therefore, hereinafter, the configuration of one recliner 4 arranged at the outer side (left side) of the vehicle will be described (refer to FIGS. 2 and 3). As shown in FIGS. 4 and 5, the recliner 4 has the ratchet 10 and the guide 20 axially mounted to each other and having a substantially circular disc shape, three poles 30 and an operating cam 40 configured to radially move the poles, which are mounted between the ratchet and the guide, a lock spring 50 consisting of a spiral spring configured to apply an urging force in a rotation direction of locking the operating cam 40 to the guide 20, and a washer faced outer circumferential ring 60 mounted over outer circumferential parts of the ratchet 10 and the guide 20 and having a cylindrical shape. The ratchet 10, the guide 20, the three poles 30 and the operating cam 40 are respectively formed of a rigid metal plate quenching-treated.

<Ratchet 10>

Hereinafter, specific configurations of the respective members will be sequentially described in detail.

As shown in FIGS. 4 and 5, the ratchet 10 has a substantially circular disc shape and is formed with a cylindrical part 12 protruding in a substantially cylindrical shape in an axial direction, which is a mounting direction to the guide 20, at an outer circumferential edge portion of a circular disc main body 11. The cylindrical part 12 is formed to have a stepped cylindrical shape of two inner and outer steps by extruding the outer circumferential edge portion of the circular disc main body 11 so as to protrude in two steps in a plate thickness direction. An inner circumferential surface of a cylindrical part of the second step, which is an outer circumferential-side of the cylindrical part 12, is formed with continuous inner circumferential teeth 12A over an entire region in the circumferential direction to which outer circumferential teeth 31 formed on an outer circumferential surface of each pole 30 (which will be described later) can be pressed and meshed from an inner side in a radial direction. Specifically, the inner circumferential teeth 12A are configured by a plurality of internal teeth facing inwards in the radial direction and continuously arranged with equal intervals of a 2° pitch in the circumferential direction.

An inner circumferential surface of a cylindrical part of the first step, which is an inner circumferential-side of the cylindrical part 12, is formed with ride-over portions 12B partially protruding inwards in the radial direction in a shelf shape at three positions in the circumferential direction. The ride-over portions 12B protrude in a shape of forming a circular arc surface of a concentric circle shape from the inner circumferential surface of the cylindrical part of the first step, which is an inner circumferential-side of the cylindrical part 12, respectively. The ride-over portions 12B are arranged side by side with equal intervals in the circumferential direction. In FIG. 5, when the ride-over portions are arranged in a line with protrusions 33 of the respective poles 3 (which will be described later), the ride-over portions are contacted to the protrusions 33 from an inner side in the radial direction as each pole 30 is moved outwards in the radial direction, thereby stopping meshing movement of each pole 30 with the ratchet 10 on the way.

Regarding the rotation area in which the ratchet 10 rotates relative to the guide 20, a rotation area in which the ride-over portions 12B are arranged in a line with the protrusions 33 of the respective poles 3 in the circumferential direction and thus stop the meshing movement of each pole 30 with the ratchet 10 on the way is a rotation area corresponding to the "free zone". Also, a rotation area in which the respective ride-over portions 12B are offset from the protrusions 33 of the respective poles 30 in the circumferential direction and the respective poles 30 can be meshed with the ratchet 10 is a rotation area corresponding to the "lock zone".

Figure 7:
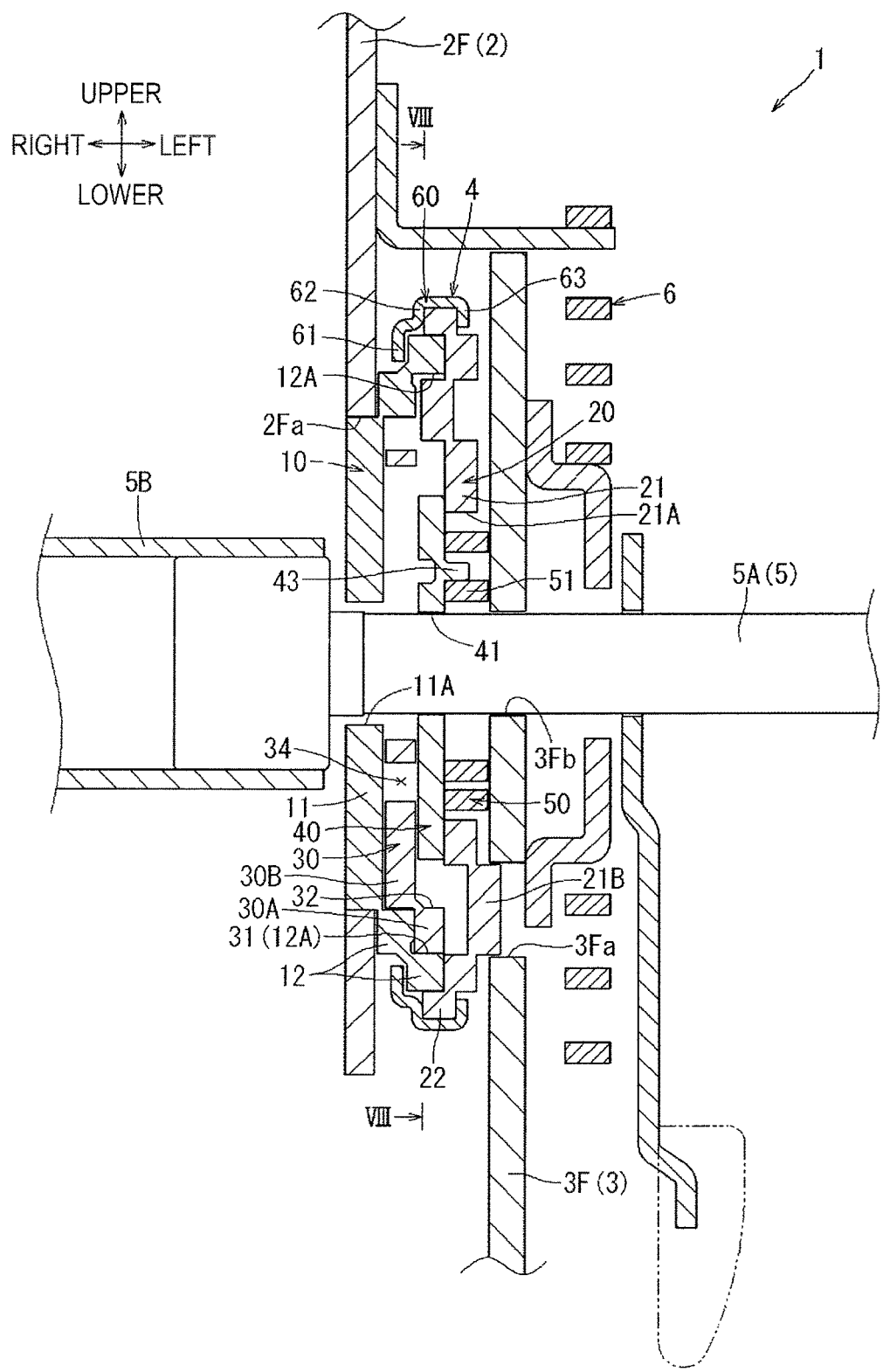
FIG. 7 is a sectional view taken along a line VII-VII of FIG. 1.

Also, the circular disc main body 11 of the ratchet 10 is formed at its central portion with a through-hole 11A having a round shape. In the through-hole 11A, an operating pin 5A that is to be inserted and mounted in a central portion of the operating cam 40 (which will be described later) is inserted to be freely rotatable from an outer side in the axial direction. As shown in FIGS. 2 and 7, the outer circumferential part of the circular disc main body 11 is fitted and welded in a fitting hole 2Fa, which is formed to penetrate the side frame 2F of the seat back 2 in a substantially round hole shape, so that the ratchet 10 having the above-described configuration is firmly and integrally coupled to the side frame 2F.

<Guide 20>

As shown in FIGS. 4 and 5, the guide 20 has a substantially circular disc shape having an outer diameter greater than that of the ratchet 10 by one size, and an outer circumferential edge portion of a circular disc main body 21 thereof has a cylindrical part 22 protruding in a cylindrical shape in the axial direction, which is a mounting direction to the ratchet 10, and formed by extrusion. The cylindrical part 22 has an inner diameter, which is slightly greater than an outer diameter of the cylindrical part of the second step, which is the outer circumferential-side of the cylindrical part 12 of the ratchet 10.

As shown in FIG. 7, by the above configuration, the cylindrical part of the second step, which is the outer circumferential-side of the cylindrical part 12 of the ratchet 10, is axially set in the cylindrical part 22, so that the guide 20 is mounted at a state where the cylindrical parts 12, 22 are gently fitted to each other inwards and outwards in the radial direction and are mutually supported to be rotatable relative to each other. Also, the outer circumferential ring 60 (which will be described later) is mounted between the cylindrical part 22 and the cylindrical part 12 of the ratchet 10 from the outer circumferential-side, so that the guide 20 is mounted via the outer circumferential ring 60 at a state where it is prevented from axially separating from the ratchet 10 (refer to FIGS. 2, 3 and 7).

As shown in FIG. 5, the circular disc main body 21 of the guide 20 is formed on its the inner surface with extruded guide walls 23 protruding in a substantially fan shape in the axial direction, which is a mounting direction to the ratchet 10, at three positions in the circumferential direction and formed by extrusion. The guide walls 23 have outer circumferential surfaces curved in circular arc shapes of concentric circles to each other and are set at a state where they are gently fitted in the cylindrical part 12 of the ratchet 10 mounted in the cylindrical part 22 of the guide 20. The respective guide walls 23 are formed so that pole accommodating grooves 24A, in which each pole 30 can be set so that it can be slid inwards and outwards in the radial direction, are formed between the respective arrangement regions of the respective guide walls 23 in the circumferential direction. Also, a central area of the circular disc main body 21 surrounded by the respective guide walls 23 is formed with a cam accommodating groove 24B in which the operating cam 40 can be set so as to be axis-rotatable.

Each guide wall 23 is configured so that it comes into contact with the corresponding pole 30 set in each pole accommodating groove 24A, which is a region between the respective arrangements of the guide walls 23 in the circumferential direction, with a slight gap T from both sides in the circumferential direction and supports the pole so as to slide only inwards and outwards in the radial direction. Also, an inner circumferential surface of each guide wall 23 is formed with a restraint portion 23A recessed outwards in the radial direction. As described later with reference to FIGS. 8 and 10, the restraint portion 23A is configured so that when each pole 30 is pushed from the inner side in the radial direction to the outer side in the radial direction by the operating cam 40, the restraint portion accommodates therein each pressing portion 35 (which will be described later), which extends from the pole 30 towards one side in the circumferential direction, from the inner side in the radial direction, and the pressing portion comes into contact with the restraint portion with being restrained from moving in the circumferential direction. Each pressing portion 35 comes into contact with each restraint portion 23A, so that each pole 30 can be meshed with the inner circumferential teeth 12A of the ratchet 10 with the backlash relative to the guide 20 in the circumferential direction being suppressed.

As shown in FIG. 5, the circular disc main body 21 of the guide 20 is formed at its central portion with a through-hole 21A having a substantially round hole shape and configured to accommodate therein the lock spring 50, which will be described later. The through-hole 21A is formed with an elongated hook hole 21C extending outwards in the radial direction from a portion of the through-hole. The hook hole 21C is configured so that an outer end portion 52 of the lock spring 50 to be set in the through-hole 21A can be fitted in the hook hole in the axial direction with being integrally fixed in the circumferential direction.

As shown in FIG. 4, the circular disc main body 21 of the guide 20 is formed on an outer surface thereof with dowels 21B axially protruding in a substantially cylindrical shape at three positions in the circumferential direction. The dowels 21B are respectively formed with being axially extruded on the outer surface, which deviates from the circumferential formation regions of the respective guide walls 23 on the outer surface of the circular disc main body 21, between the respective arrangement regions of the guide walls 23. As shown in FIGS. 3 and 7, the respective dowels 21B protruding from the outer surface of the circular disc main body 21 are fitted and welded to respective fitting holes 3Fa formed in the reclining plate 3F, so that the guide 20 is firmly and integrally coupled to the reclining plate 3F. The reclining plate 3F is further formed with a through-hole 3Fb having a round hole shape and configured so that the operating pin 5A passing through the guide 20 from an axially inner side towards an axially outer side can pass therethrough.

<Pole 30>

As shown in FIG. 5, each of the three poles 30 is formed by a plate material cut into a substantially rectangular shape. Each pole 30 is set with being accommodated in each pole accommodating groove 24A formed on the inner surface of the circular disc main body 21 of the guide 20. An inner circumferential-side area 30B, which is arranged at an inner circumferential-side when each pole 30 is mounted in each pole accommodating groove 24A of the guide 20, is extruded into a half-blanked shape in the axial direction, which is a mounting direction to the ratchet 10, with respect to an outer circumferential-side area 30A. At a state where each pole 30 is mounted in each pole accommodating groove 24A, each pole is supported from both sides in the circumferential direction by the guide walls 23 positioned at both sides of each pole accommodating groove 24A in the circumferential direction and is thus restrained so that it can move only inwards and outwards in the radial direction (refer to FIG. 8).

Also, as shown in FIG. 7, at the state where each pole 30 is mounted in each pole accommodating groove 24A, the outer circumferential-side area 30A half-blanked in the axial direction is provided on the inner surface of the circular disc main body 21 of the guide 20, so that the inner circumferential teeth 12A of the cylindrical part 12 of the ratchet 10 mounted in the cylindrical part 22 of the guide 20 are exposed at an outer position of the area 30A in the radial direction. Also, at the mounted state, each pole 30 is set with the inner circumferential-side area 30B, which is half-blanked in the axial direction, floating from the inner surface of the circular disc main body 21 of the guide 20, so that the inner circumferential surface of the cylindrical part of the first step, which is an inner circumferential-side on which the ride-over portions 12B of the cylindrical part 12 of the ratchet 10 are formed, is exposed at an outer position of the area 30B in the radial direction.

As shown in FIGS. 4 and 5, an outer circumferential surface of the outer circumferential-side area 30A of each pole 30, which is half-blanked in the axial direction, is formed thereon with the outer circumferential teeth 31, which can be meshed with the inner circumferential teeth 12A of the ratchet 10 and are formed continuously side by side over an entire region in the circumferential direction. Specifically, the outer circumferential teeth 31 are configured by a plurality of external teeth facing outwards in the radial direction and continuously arranged side by side with equal intervals of a 2° pitch in the circumferential direction.

Also, as shown in FIG. 5, an outer circumferential surface of the inner circumferential-side area 30B of each pole 30, which is half-blanked in the axial direction, is formed thereon with the protrusion 33 partially protruding outwards in the radial direction at a central place in the circumferential direction. Also, the inner circumferential-side area 30B of each pole 30, which is half-blanked in the axial direction, is formed thereon with a long hole 34 penetrating therethrough in the axial direction and extending in a substantially circular arc shape in the circumferential direction. In the long hole 34, each pull-in pin 42 formed on the operating cam 40 (which will be described later) is to be axially inserted and set.

Figure 8:
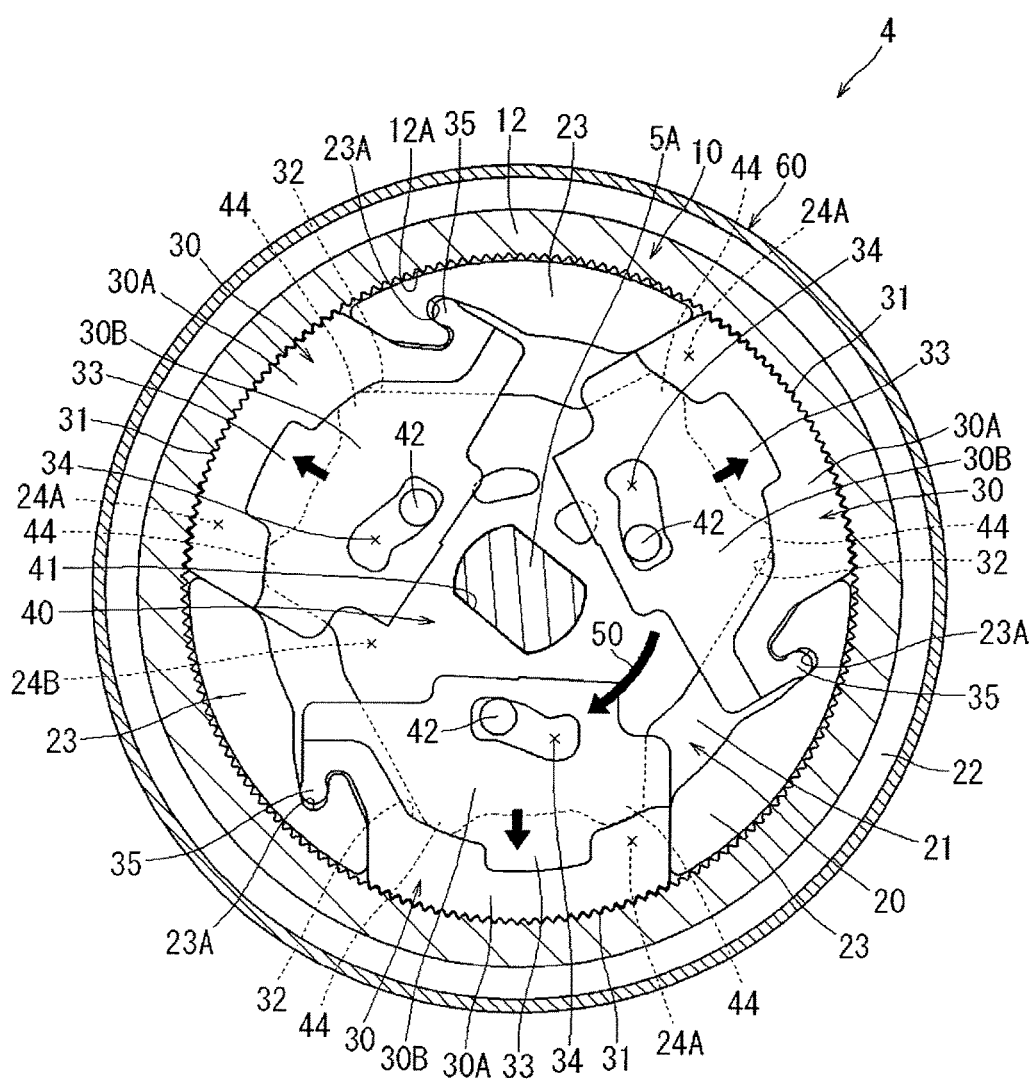
FIG. 8 is a sectional view taken along a line VIII-VIII of FIG. 7, depicting a lock state of the recliner.
Figure 9:
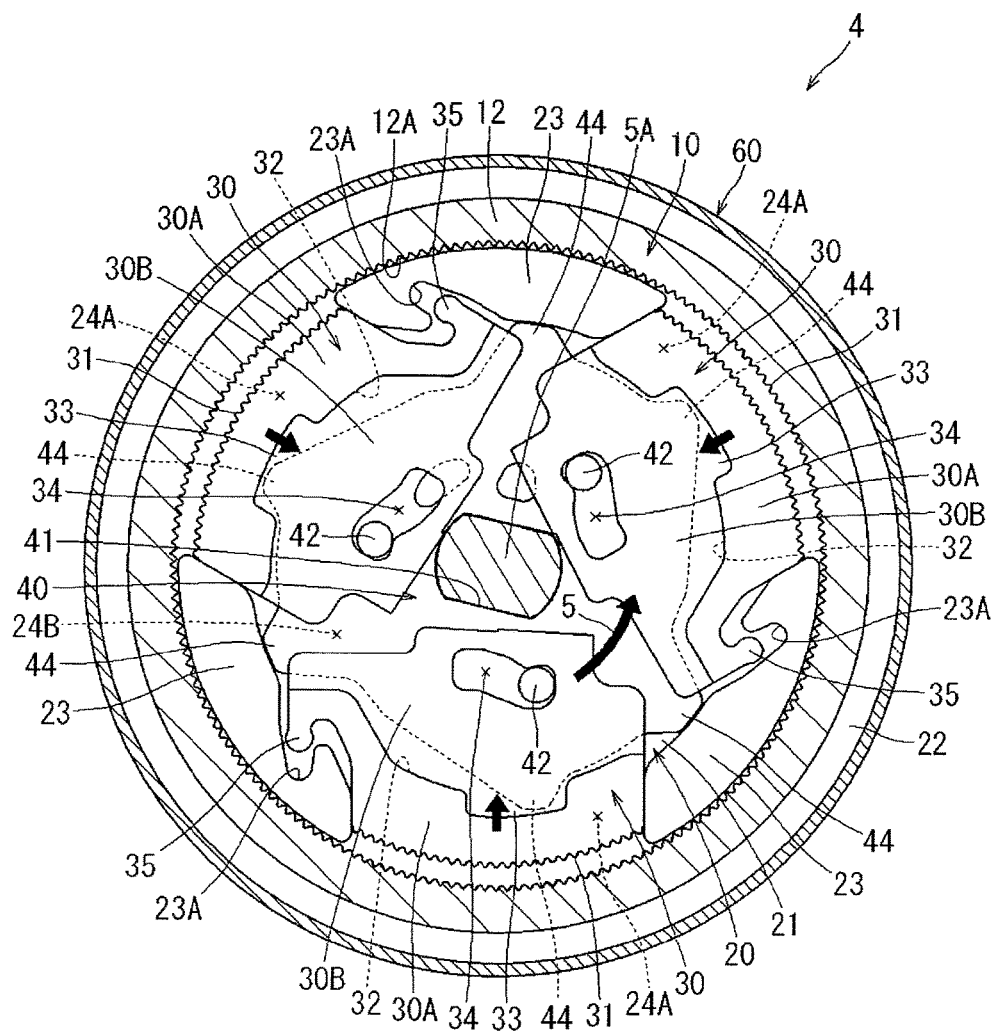
FIG. 9 is a sectional view depicting an unlock lock state of the recliner.

As shown in FIGS. 8 and 9, when the operating cam 40 set at the central part of the guide 20 is axis-rotated in forward and reverse directions by an urging force of the lock spring 50 or a pulling-up operation force of the reclining lever 5, the respective poles 30 are pushed outwards in the radial direction (refer to FIG. 8) or inwards (refer to FIG. 9) in the radial direction by the operating cam 40.

As shown in FIG. 8, when each pole 30 is pushed from the inner side in the radial direction towards the outer side in the radial direction by the operating cam 40, the outer circumferential teeth 31 formed on the outer circumferential surface of the pole are pressed and meshed with the inner circumferential teeth 12A of the ratchet 10. By the meshing, each pole 30 is integrally coupled to the ratchet 10 in the circumferential direction, and the relative rotation between the ratchet 10 and the guide 20 is locked via each pole 30. That is, regarding the relation with the guide 20, each pole 30 can move only inwards and outwards in the radial direction because it is supported by each guide wall 23 in the circumferential direction. Therefore, each pole 30 is meshed with the ratchet 10 and integrally coupled thereto in the circumferential direction, so that it locks the rotation of the ratchet 10 relative to the guide 20.

Also, as shown in FIG. 9, when each pole 30 is pushed inwards in the radial direction by the operating cam 40, it is released from the meshed state with the inner circumferential teeth 12A of the ratchet 10. Thereby, the rotation lock state between the ratchet 10 and the guide 20 is released and is switched to a state where the ratchet 10 and the guide 20 can rotate relative to each other. In this way, the rotation lock state is switched to the release state, so that it is possible to change the backrest angle of the seat back 2 (refer to FIG. 1).

Specifically, as shown in FIG. 8, each pole 30 is configured so that the inner circumferential surface of the outer circumferential-side area 30A, which is half-blanked in the axial direction, functions as a pressed surface 32 and is moved by receiving a pressing force which is applied from the inner side in the radial direction towards the outer side in the radial direction by each shoulder portion 44 protruding upwards from the outer circumferential surface of the operating cam 40 as the operating cam 40 is rotated in a clockwise direction of FIG. 8. Also, as shown in FIG. 9, when the operating cam 40 is rotated in a counterclockwise direction of FIG. 9, each pole 30 is correspondingly pushed inwards in the radial direction by each pull-in pin 42 of the operating cam 40 inserted in each long hole 34 formed on the inner circumferential-side area 30B, which is half-blanked in the axial direction.

Specifically, when each pole 30 is pushed outwards in the radial direction by the operating cam 40 (refer to FIG. 8) to be moved, each pressing portion 35 extending from one side of the pole in the circumferential direction is pushed into each restraint portion 23A, which is formed on the inner circumferential surface of each guide wall 23 configured to support each pole 30 from one side in the circumferential direction, from the inner side in the radial direction and comes into contact with each restraint portion 23A, so that the backlash in the circumferential direction is suppressed. As the operating cam 40 is further rotated, each pressing portion 35 is pushed outwards in the radial direction from the state where it comes into contact with each restraint portion 23A, so that each pole 30 is moved to a position at which it is meshed with the inner circumferential teeth 12A of the ratchet 10.

Figure 10:
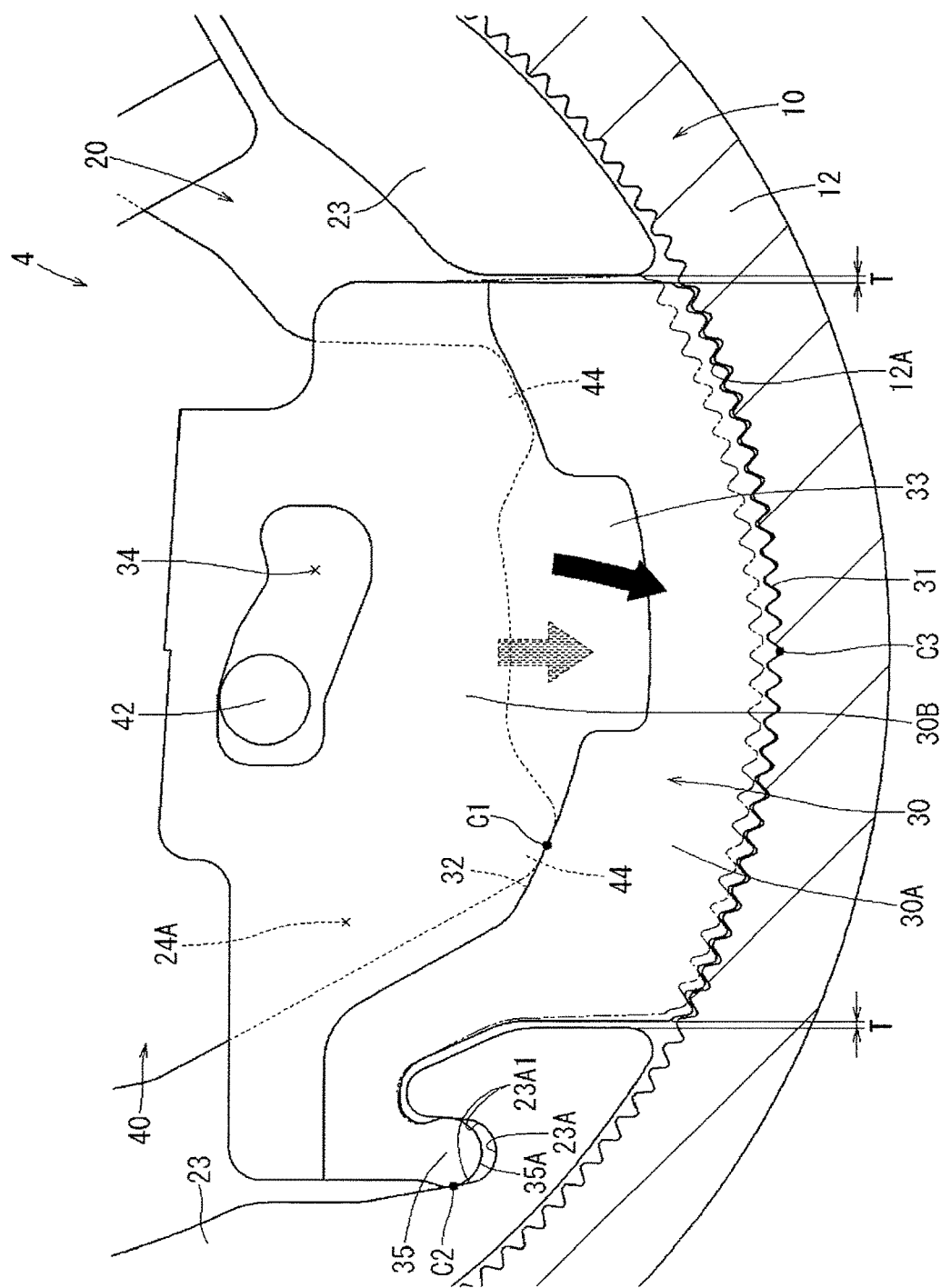
FIG. 10 is an enlarged pictorial view depicting movement of a pole until it is pushed by an operating cam and is thus meshed with a ratchet.

More specifically, as shown in FIG. 10, when each pole 30 is pushed from the inner side in the radial direction towards the outer side in the radial direction by the operating cam 40, each pressing portion 35 is pushed into each restraint portion 23A and comes into contact with each restraint portion 23A before the outer circumferential teeth 31 meshes with the ratchet 10. Each restraint portion 23A has a shape where a concave inner wall surface configured to accommodate therein each pressing portion 35 is configured as inclined surfaces 23A1 of which an accommodation width is gradually narrowed in a tapered shape from the inner side in the radial direction towards the outer side in the radial direction. On the other hand, a tip end surface of each pressing portion 35 is a convex curved surface 35A which is curved in a precise circle shape and is expanded, and the curved surface 35A is butted to both inclined surfaces 23A1, which are inclined in a tapered shape, of each restraint portion 23A and thus comes into contact with each restraint portion 23A in the radial direction and in the circumferential direction.

After each pressing portion 35 comes into contact with each restraint portion 23A, when each pole 30 is pressed from the inner side in the radial direction toward the outer side in the radial direction as the operating cam 40 is further rotated, with a contact point (second contact point C2) at which the curved surface 35A of each pressing portion 35 comes into contact with the inclined surface 23A1 of the restraint portion 23A serving as a fulcrum, the pole is pushed outwards in the radial direction and rotated while sliding the curved surface 35A relative to each inclined surface 23A1 by keeping the contact point (second contact point C2) to be constant, so that the outer circumferential teeth 31 meshes with the inner circumferential teeth 12A of the ratchet 10.

Figure 11:
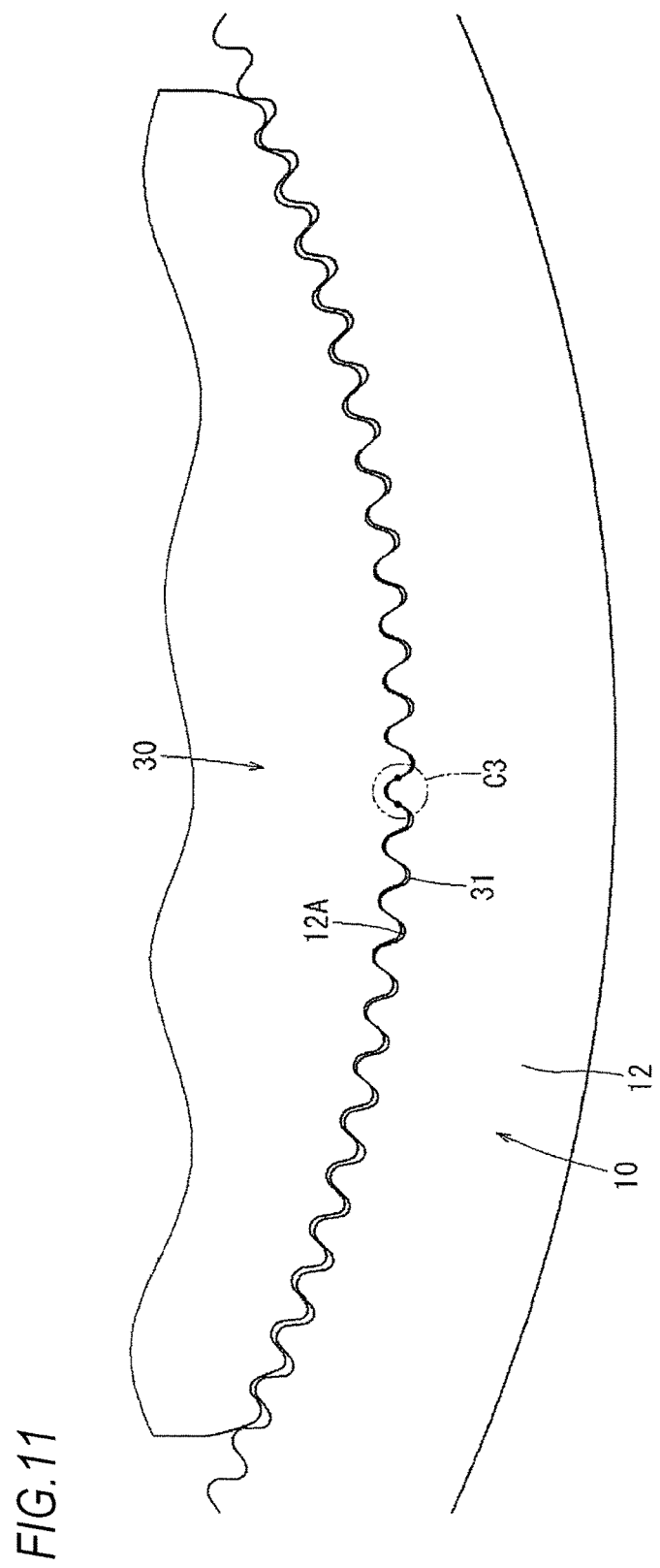
FIG. 11 is an enlarged pictorial view depicting an engaging part between the pole and the ratchet.

Herein, as shown in FIG. 11, the outer circumferential teeth 31 of each pole 30 are configured to have tooth depths so that the outer circumferential teeth are meshed deepest with the inner circumferential teeth 12A of the ratchet 10 at the central place thereof in the circumferential direction and the meshing depth level with the inner circumferential teeth 12A of the ratchet 10 becomes gradually shallow towards both ends in the circumferential direction from the meshed state at the central place. By this configuration, as shown in FIG. 10, in each pole 30, even when each pressing portion 35 is pushed outwards in the radial direction with the contact point (second contact point C2) serving as the fulcrum and each pole 30 is rotated and meshed with the inner circumferential teeth 12A of the ratchet 10, the outer circumferential teeth 31 at the central place (third contact point C3) in the circumferential direction are meshed with the inner circumferential teeth 12A of the ratchet 10 earlier than at the other places. Here, the specific shape of the outer circumferential teeth 31 is disclosed in JP-A-2015-29635.

A first contact point C1 at which each pole 30 is pressed from the inner side in the radial direction by each shoulder portion 44 of the operating cam 40, the second contact point C2 at which the pressing portion 35 of each pole 30 is in contact with the restraint portion 23A of each guide wall 23, and the third contact point C3 at which the outer circumferential teeth 31 of each pole 30 are meshed with the inner circumferential teeth 12A of the ratchet 10 are offset from each other in the circumferential direction. Specifically, the first contact point C1 is arranged at a position in the circumferential direction between the second contact point C2 and the third contact point C3, and lines connecting the first contact point C1, the second contact point C2 and the third contact point C3 form a triangular shape extending in an elongated shape in the circumferential direction.

By the above arrangement relation of the contact points, when each pole 30 is pushed from the inner side in the radial direction towards the outer side in the radial direction by each shoulder portion 44 of the operating cam 40, the pressing portion 35 of each pole 30 appropriately comes into contact with the restraint portion 23A of each guide wall 23, and the outer circumferential teeth 31 of each pole 30 are then appropriately meshed with the inner circumferential teeth 12A of the ratchet 10 after the contact. In the meantime, a shape relation between the pressing portion 35 of each pole 30 and the restraint portion 23A of each guide wall 23 may be determined so that the third contact point C3 comes into contact earlier than the second contact point C2. Also in this case, the second contact point C2 can come into contact while pushing obliquely and rotating each pole 30 in the circumferential direction with the third contact point C3 serving as the fulcrum.

<Operating Cam 40>

As shown in FIG. 5, the operating cam 40 has a substantially circular disc shape and is set with being accommodated in the cam accommodating groove 24B formed on the inner surface of the circular disc main body 21 of the guide 20. As shown in FIG. 7, the operating cam 40 has substantially the same plate thickness as each pole 30 and is interposed between the inner surface of the circular disc main body 21 of the guide 20 and the inner circumferential-side area 30B of each pole 30, which is half-blanked in the axial direction, so that the operating cam is arranged at an inner side in the radial direction at which it is surrounded from the outer circumferential-side thereof by the outer circumferential-side area 30A of each pole 30.

As shown in FIG. 5, the operating cam 40 is formed at its central portion with a through-hole 41 in which the operating pin 5A, which is integrally coupled to the reclining lever 5 (refer to FIG. 1), can be inserted and integrally mounted from the inner side in the axial direction. As shown in FIG. 5, the operating pin 5A is inserted into the through-hole 41 of the operating cam 40 from the inner side in the axial direction towards the outer side in the axial direction and is integrally connected to the reclining lever 5 (refer to FIG. 1) at an end thereof, so that the operating cam 40 is integrally rotated as the reclining lever 5 is pulled up. The operating pin 5A is integrally coupled to the operating pin 5A inserted in the other recliner 4 (refer to FIG. 1) via a connecting rod 5B, so that when the reclining lever 5 is pulled up, the other operating pin 5A is also integrally rotated.

As shown in FIG. 5, the operating cam 40 has a substantially circular disc shape slightly greater than the through-hole 21A formed at the central portion of the guide 20, and has two axially protruding hook pins 43 formed on a surface facing towards the through-hole 21A of the guide 20. As shown in FIG. 3, an inner end portion 51 of the lock spring 50, which will be described later, is hooked and integrally fixed between the hook pins 43.

The operating cam 40 is mounted to the guide 20 with being elastically supported via the lock spring 50. That is, at the state where the operating cam 40 is set in the cam accommodating groove 24B of the guide 20, the inner end portion 51 of the lock spring 50 is hooked between the hook pins 43 protruding upwards from the surface facing towards the through-hole 21A of the guide 20, the outer end portion 52 of the lock spring 50 is hooked in the hook hole 21C extending from the through-hole 21A of the guide 20 and the lock spring 50 is thus set in the through-hole 21A of the guide 20, so that the operating cam is mounted to the guide 20 with being elastically supported via the lock spring 50.

By the mounting, as shown in FIG. 7, the operating cam 40 is supported with being interposed between the guide 20 and the axially half-blanked inner circumferential-side area 30B of each pole 30 in the axial direction, and is surrounded, in the radial direction, by the pressed surface 32 of the outer circumferential-side area 30A of each pole 30, which is half-blanked in the axial direction, from the outer circumferential-side thereof, as shown in FIG. 8. The operating cam 40 is always rotationally urged in the clockwise direction of FIG. 8 to the guide 20 by the spring urging force of the lock spring 50 (refer to FIG. 3) hooked between the operating cam and the guide 20. By the rotation in the counterclockwise direction by the urging force, the operating cam 40 is operated to gradually push the pressed surface 32 of each pole 30 from the inner side in the radial direction towards the outer side in the radial direction by the respective shoulder portions 44 protruding from the plurality of places on the outer circumferential part of the operating cam 40 in the circumferential direction.

Also, when the reclining lever 5 (refer to FIG. 1) is pulled up, the operating cam 40 is rotated in the counterclockwise direction, which is an opposite direction to the urging direction of the operating pin 5A, as shown in FIG. 9. Thereby, each pull-in pin 42 inserted in the long hole 34 of each pole 30 moves towards the outer side in the radial direction of each long hole 34 with moving in each long hole 34 in the circumferential direction, so that the operating cam 40 pushes each pole 30 towards the inner side in the radial direction.

<Outer Circumferential Ring 60>

As shown in FIGS. 4 and 5, the outer circumferential ring 60 is formed to have a washer faced cylindrical shape by punching a thin plate material into a ring shape and drawing an outer circumferential part of the punched circular disc in a plate thickness direction. Specifically, the outer circumferential ring 60 has a configuration where an inner circumferential part of the washer is further axially pushed relative to an outer circumferential part of the washer, so that the inner circumferential part of the washer is formed with a first pressing portion 61, which comes into contact with the cylindrical part of the second step, which is an outer circumferential side of the cylindrical part 12 of the ratchet 10, from the outer side in the axial direction, and the outer circumferential part of the washer is formed with a second pressing portion 62, which comes into contact with the cylindrical part 22 of the guide 20 from the inner side in the axial direction.

The outer circumferential ring 60 is integrally mounted to the guide 20 at a state where after the ratchet 10 and the guide 20 are sequentially mounted in the axial direction in the cylinder of the outer circumferential ring 60, an end (crimping portion 63) of the cylindrical part extending axially beyond the guide 20 is bent and crimped inwards in the radial direction at the second pressing portion 62 and thus the cylindrical part 22 of the guide 20 is integrally interposed and crimped in the axial direction between the crimping portion 63 and the second pressing portion 62. By the mounting, the outer circumferential ring 60 keeps the ratchet 10 at a state where the ratchet can rotate relative to the guide 20 without being separated in the axial direction, with the first pressing portion 61 facing the outer side of the cylindrical part 12 of the ratchet 10 in the axial direction.

<Summary>

To wrap up, the recliner 4 of the illustrative embodiment is configured as follows. That is, the recliner 4 functions as a rotary shaft device capable of stooping rotation, and includes the ratchet 10 and the guide 20 axially mounted to be rotatable relative to each other and the lock mechanism provided between the ratchet 10 and the guide 20 and configured to lock the relative rotation between the ratchet 10 and the guide 20 by meshing in the radial direction. The lock mechanism includes the plurality of poles 30 which is configured to be supported in the circumferential direction by the guide 20 and has the outer circumferential teeth 31 configured to mesh with the inner circumferential teeth 12A formed on the ratchet 10 as the poles 30 are pushed outwards in the radial direction to be moved, the plurality of poles 30 including a specific pole (all of the poles 30), and the operating cam 40 configured to push the plurality of poles 30 outwards in the radial direction with respect to the guide 20. The specific pole (all the poles 30) includes the pressing portion 35 configured to contact the restraint portion 23A of the guide 20 from the inner side in the radial direction so as to be restrained from moving in the circumferential direction as the specific pole is pushed outwards in the radial direction by the operating cam 40 to be moved.

By the above configuration, even when the gap T in the circumferential direction for securing slidability between the plurality of poles 30 and the guide 20 configured to support the plurality of poles in the circumferential direction is formed, the pressing portion 35 of the specific pole (all the poles 30) comes into contact with the restraint portion 23A of the guide 20 when each pole 30 is meshed with the ratchet 10. Accordingly, the backlash of the specific pole (all the poles 30) relative to the guide 20 in the circumferential direction is restrained. By the restraint, it is possible to reduce the backlash between the ratchet 10 and the guide 20 in the circumferential direction with a simple configuration, via the specific pole (all the poles 30) that is meshed with the ratchet 10 in conformity to the restraint.

Also, the first contact point C1 at which the specific pole (all the poles 30) is pushed from the inner side in the radial direction by the operating cam 40, the second contact point C2 at which the pressing portion 35 is in contact with the restraint portion 23A, and the third contact point C3 at which a part of the outer circumferential teeth 31 of the specific pole (all the poles 30) is preferentially pressed and meshed with the ratchet 10 are offset from each other in the circumferential direction. By this configuration, even when the specific pole (all the poles 30) is pushed from the inner side in the radial direction by the operating cam 40 and one of the second contact point C2 and the third contact point C3 thus comes into contact first, the other of the second contact point C2 and the third contact point C3 can also appropriately come into contact as further movement proceeds. Accordingly, it is possible to appropriately correct a posture of the specific pole (all the poles 30).

Also, as the specific pole (all the poles 30) is pushed outwards in the radial direction by the operating cam 40 to be moved, the pressing portion 35 comes into contact with the restraint portion 23A before the specific pole (all the poles 30) meshes with the ratchet 10, and as the specific pole (all the poles 30) is further moved, the specific pole (all the poles 30) meshes with the ratchet 10. By this configuration, it is possible to enable the specific pole (all the poles 30) to mesh with the ratchet 10 at a state where the pressing portion 35 of the specific pole (all the poles 30) is appropriately in contact with the restraint portion 23A of the guide 20.

Also, a shape of a contact portion (second contact point C2) between the pressing portion 35 and the restraint portion 23A is a line contact shape (the curved surface 35A curved in a precise circle shape comes into linear contact with the inclined surface 23A1 having the tapered shape), and the contact portion (second contact point C2) serves as a fulcrum capable of enabling the specific pole (all the poles 30) to rotate outwards in the radial direction so that the specific pole (all the poles 30) meshes with the ratchet 10. By this configuration, it is possible to enable the specific pole (all the poles 30) to mesh with the ratchet 10 with stable movement, without changing the contact portion (second contact point C2) between the pressing portion 35 of the specific pole (all the poles 30) and the restraint portion 23A of the guide 20.

Also, the pressing portion 35 has a convex shape extending from the specific pole (all the poles 30) in the circumferential direction, and the restraint portion 23A has a concave shape recessed in the guide 20 so as to accommodate therein the pressing portion 35 from the inner side in the radial direction. In this way, regarding the shape relation between the guide 20 and the specific pole (all the poles 30), the guide 20 having the larger shape includes the restraint portion 23A having a concave shape, and the specific pole (all the poles 30) having the smaller shape includes the pressing portion 35 having a convex shape. Accordingly, it is possible to conveniently form the guide and the specific pole with high formability by decreasing or increasing thicknesses thereof.

Also, each of the plurality of poles 30 includes the pressing portion 35. By this configuration, it is possible to effectively reduce the backlash between the ratchet 10 and the guide 20 in the circumferential direction by the simple configuration.

Other Illustrative Embodiments

Although the illustrative embodiment of the disclosure has been described with reference to one embodiment, the disclosure can be implemented in a variety of forms, in addition to the above embodiment. For example, the recliner of the disclosure can be applied to not only any seat of the automobile in addition to the left seat but also a variety of vehicle seats for vehicles other than the automobile, for example, a train, an airplane, a ship and the like. Also, the recliner may be configured to couple the seat back to the seat cushion so that the backrest angle can be adjusted, or to couple the seat back to a base such as a bracket fixed on a floor so that the backrest angle can be adjusted.

Also, the recliner may have a configuration where the ratchet is coupled to a member such as the seat cushion fixed on the floor and the guide is coupled to the seat back. Also, regarding the plurality of poles configuring the lock mechanism of the recliner, two or four or more poles may be arranged side by side in the circumferential direction. The arrangement of the respective poles in the circumferential direction is not limited to the equally spaced arrangement and may be unequally arranged. Also, the operating cam configured to push each pole outwards in the radial direction may be a type where it slides in the radial direction to push each pole in the radial direction perpendicular to the sliding direction (refer to JP-A-2015-227071), in addition to the above type where the operating cam rotates to push each pole outwards in the radial direction. In the meantime, the operation of returning each pole to the inner side in the radial direction may be performed by a member separate from the operating cam, such as a release plate (refer to JP-A-2015-227071).

Also, at least one pole of the plurality of poles may have the pressing portion configured to contact the restraint portion of the guide when the pole is pushed outwards in the radial direction by the operating cam. That is, it is not necessarily required that all the poles have the pressing portion configured to contact the restraint portion. Also, a configuration where the backlash of one side in the circumferential direction is reduced by the pressing portion formed at one pole and the backlash of the other side in the circumferential direction is reduced by the pressing portion formed at another pole is possible.

Also, regarding the shape relation between the pressing portion and the restraint portion, it is not necessarily required that the pressing portion is convex and the restraint portion is concave. That is, the pressing portion may be concave and the restraint portion may be convex. Also, instead of the concave and convex shape relation between the pressing portion and the restraint portion, the pressing portion and the restraint portion may simply face each other and come into contact with each other. The pressing portion and the restraint portion may come into contact with each other in a point contact or surface contact manner, such as contact between curved surfaces and contact between planar surfaces, in addition to the linear contact.

Also, the specific pole having the pressing portion may have a configuration where when the specific pole is pushed outwards in the radial direction by the operating cam, the pressing portion is first meshed with the ratchet before the pressing portion comes into contact with the restraint portion, and when the specific pole is further moved, the specific pole is tilted with the meshed point serving as a fulcrum and the pressing portion thus comes into contact with the restraint portion. Also, the specific pole may have a configuration where a place of the outer circumferential teeth deviating from the central place in the circumferential direction is meshed deepest with the ratchet, instead of the above configuration where the central place of the outer circumferential teeth in the circumferential direction is meshed deepest with the ratchet. In any configuration, it is possible to cause the specific pole to take an angle posture inclined in the circumferential direction, with the point at which the specific pole is meshed deepest with the ratchet serving as the fulcrum.

The disclosure provides illustrative, non-limiting examples as follows:

According to a first aspect, there is provided a recliner configured to function as a rotary shaft device capable of stopping rotation, the recliner including: a ratchet and a guide mounted in an axial direction to be rotatable relative to each other; and a lock mechanism provided between the ratchet and the guide and configured to lock the relative rotation between the ratchet and the guide by meshing in a radial direction, the lock mechanism including: a plurality of poles which is configured to be supported in a circumferential direction by the guide and has outer circumferential teeth configured to mesh with inner circumferential teeth formed on the ratchet as the poles are pushed outwards in the radial direction to be moved, the plurality of poles including a specific pole; and an operating cam configured to push the plurality of poles outwards in the radial direction with respect to the guide, wherein the specific pole includes a pressing portion configured to contact a restraint portion of the guide from an inner side in the radial direction so as to be restrained from moving in the circumferential direction as the specific pole is pushed outwards in the radial direction by the operating cam to be moved.

According to the first aspect, even when a gap in the circumferential direction for securing slidability between the plurality of poles and the guide configured to support the plurality of poles in the circumferential direction is formed, the pressing portion of the specific pole comes into contact with the restraint portion of the guide when each pole is meshed with the ratchet. Accordingly, the backlash of the specific pole relative to the guide in the circumferential direction is restrained. By the restraint, it is possible to reduce the backlash between the ratchet and the guide in the circumferential direction with a simple configuration, via the specific pole that is meshed with the ratchet in conformity to the restraint.

According to a second aspect, there is provided the recliner according to the first aspect, wherein a first contact point at which the specific pole is pushed from the inner side in the radial direction by the operating cam, a second contact point at which the pressing portion is in contact with the restraint portion, and a third contact point at which a part of the outer circumferential teeth of the specific pole is preferentially pressed and meshed with the ratchet are offset from each other in the circumferential direction.

According to the second aspect, even when the specific pole is pushed from the inner side in the radial direction by the operating cam and one of the second contact point and the third contact point thus comes into contact first, the other of the second contact point and the third contact point can also appropriately come into contact as further movement proceeds. Accordingly, it is possible to appropriately correct a posture of the specific pole.

According to a third aspect, there is provided the recliner according to the first or second aspect, wherein, as the specific pole is pushed outwards in the radial direction by the operating cam to be moved, the pressing portion comes into contact with the restraint portion before the specific pole meshes with the ratchet, and as the specific pole is further moved, the specific pole meshes with the ratchet.

According to the third aspect, it is possible to enable the specific pole to mesh with the ratchet at a state where the pressing portion of the specific pole is appropriately in contact with the restraint portion of the guide.

According to a fourth aspect, there is provided the recliner according to the third aspect, wherein a shape of a contact portion between the pressing portion and the restraint portion is a line contact shape, and the contact portion serves as a fulcrum which is capable of enabling the specific pole to rotate outwards in the radial direction so that the specific pole meshes with the ratchet.

According to the fourth aspect, it is possible to enable the specific pole to mesh with the ratchet with stable movement, without changing the contact portion between the pressing portion of the specific pole and the restraint portion of the guide.

According to a fifth aspect, there is provided the recliner according to one of the first to fourth aspects, wherein the pressing portion has a convex shape extending from the specific pole in the circumferential direction, and the restraint portion has a concave shape recessed in the guide so as to accommodate therein the pressing portion from the inner side in the radial direction.

According to the fifth aspect, regarding the shape relation between the guide and the specific pole, the guide having a larger shape includes the restraint portion having a concave shape, and the specific pole having a smaller shape includes the pressing portion having a convex shape. Accordingly, it is possible to conveniently form the guide and the specific pole with high formability by decreasing or increasing thicknesses thereof.

According to a sixth aspect, there is provided the recliner according to any one of the first to fifth aspects, wherein each of the plurality of poles includes the pressing portion.

According to the sixth aspect, it is possible to effectively reduce the backlash between the ratchet and the guide in the circumferential direction by the simple configuration.

According to a seventh aspect, there is provided the recliner according to any one of the first to sixth aspects, wherein the operating cam is configured to be rotated, and wherein the operating cam is configured push the plurality of poles outwards in the radial direction by being rotated.

What is claimed is:

1. A recliner configured to function as a rotary shaft device capable of stopping rotation, the recliner comprising:
   a ratchet and a guide mounted in an axial direction to be rotatable relative to each other; and
   a lock mechanism provided between the ratchet and the guide and configured to lock the relative rotation between the ratchet and the guide by meshing in a radial direction, the lock mechanism including:
   a plurality of poles which is configured to be supported in a circumferential direction by the guide and has outer circumferential teeth configured to mesh with inner circumferential teeth formed on the ratchet as the poles are pushed outwards in the radial direction to be moved, the plurality of poles including a specific pole; and
   an operating cam configured to push the plurality of poles outwards in the radial direction with respect to the guide,
   wherein the specific pole includes a pressing portion including a protrusion, configured to contact a restraint portion, including a recess, of the guide from an inner side in the radial direction so as to be restrained from moving in the circumferential direction as the specific pole is pushed outwards in the radial direction by the operating cam to be moved,
   wherein the protrusion of the specific pole is configured to interlock with the recess of the restraint portion in the circumferential direction.

2. The recliner according to claim 1,
   wherein a first contact point at which the specific pole is pushed from the inner side in the radial direction by the operating cam, a second contact point at which the pressing portion is in contact with the restraint portion, and a third contact point at which a part of the outer circumferential teeth of the specific pole is preferentially pressed and meshed with the ratchet are offset from each other in the circumferential direction.

3. The recliner according to claim 1,
   wherein, as the specific pole is pushed outwards in the radial direction by the operating cam to be moved, the pressing portion comes into contact with the restraint portion before the specific pole meshes with the ratchet, and as the specific pole is further moved, the specific pole meshes with the ratchet.

4. The recliner according to claim 3,
   wherein a shape of a contact portion between the pressing portion and the restraint portion is a line contact shape, and the contact portion serves as a fulcrum which is capable of enabling the specific pole to rotate outwards in the radial direction so that the specific pole meshes with the ratchet.

5. The recliner according to claim 1,
   wherein the pressing portion has a convex shape extending from the specific pole in the circumferential direction, and the restraint portion has a concave shape recessed in the guide so as to accommodate therein the pressing portion from the inner side in the radial direction.

6. The recliner according to claim 1,
   wherein each of the plurality of poles includes the pressing portion.

7. The recliner according to claim 1,
   wherein the operating cam is configured to be rotated, and wherein the operating cam is configured push the plurality of poles outwards in the radial direction by being rotated.

* * * * *